Oct. 30, 1973  I. C. KAFEJIEV ET AL  3,769,439
METHOD OF PEELING FRUITS AND VEGETABLES
Filed Dec. 3, 1970  4 Sheets-Sheet 1

INVENTORS:
ILIYA CHUDOMIROV KAFEJIEV
LUBOMIR NIKOLOV GUENCHEV
KOSTADIN SPIROV KLYAMOV

BY: Arthur O. Klein
ATTORNEY

INVENTORS:
ILIYA CHUDOMIROV KAFEJIEV
LUBOMIR NIKOLOV GUENCHEV
KOSTADIN SPIROV KLYAMOV

BY: Arthur O. Klein
ATTORNEY

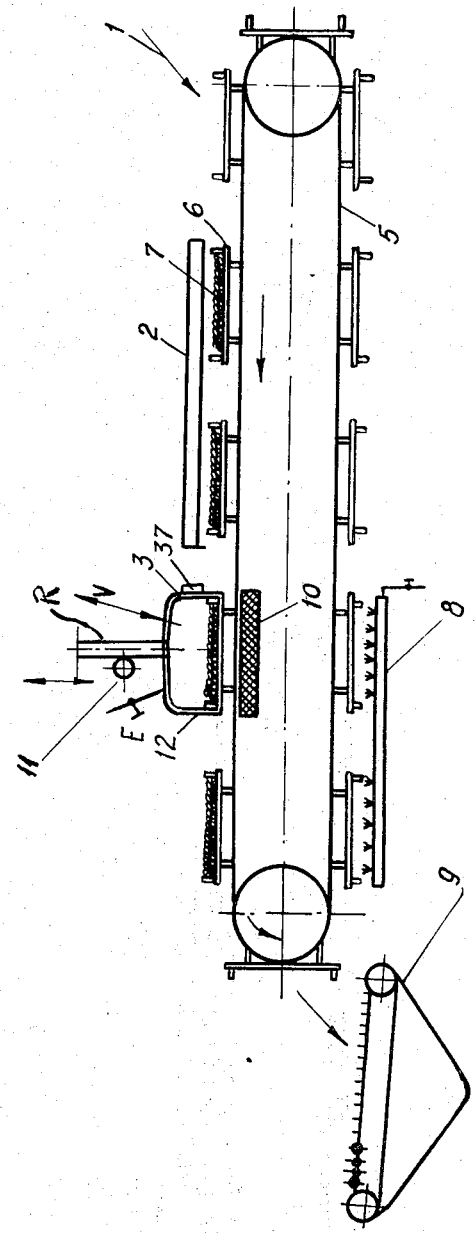

United States Patent Office
3,769,439
Patented Oct. 30, 1973

3,769,439
METHOD OF PEELING FRUITS AND VEGETABLES
Iliya Chudomirov Kafejiev, Lubomir Nikolov Guenchev, and Kostadin Spirov Klyamov, Plovdiv, Bulgaria, assignors to DSO "Bulgarplod," Sofia, Bulgaria
Filed Dec. 3, 1970, Ser. No. 94,779
Claims priority, application Bulgaria, Dec. 12, 1969, 13,297
Int. Cl. A23n 7/00
U.S. Cl. 426—482                          4 Claims

ABSTRACT OF THE DISCLOSURE

Method and apparatus for peeling fruits and vegetables, wherein the fruits and vegetables are heated superficially from 60 to 100° C., after which they are placed in a vacuum having an absolute pressure of about 460 mm. mercury column or lower, causing thereby an explosive separation of the skin, and are then taken out of the vacuum and processed in known ways.

---

This invention relates to a method of and an apparatus for peeling fruits and vegetables, tomatoes in particular, regardless of their variety and sizes, preserving the valuable gloss at their peeled surface, and creating conditions at the same time for the dissociation of the gases contained inside the tissue.

A method is known for peeling tomatoes, which utilizes superheated steam. The quality graded, size calibrated and washed tomatoes are fed into a steaming unit where, under the action of the superheated steam flowing out of nozzles at a temperature of from 360 to 400° C. and a pressure of up to 3 atmospheres, there is brought about a rapid heating of the skin and the surface layer, whereby the water contained below the skin of the tomatoes starts to boil. The vapors produced tear the skin of the tomatoes, and as a result part of the skin separates, and the part of the skin left on the surface is then removed by means of a roller peeler; and the rest is removed manually during the following inspection. This method of processing requires, however, a considerable steam consumption and a heavy and expensive steam superheater of low efficiency. The flow around the tomatoes is non-uniform, which results in local overheating or underheating. It is difficult to separate the burned skin, and it passes into the finished product, thus impairing its quality. As a result of the high-temperature processing the quality of the peeled tomatoes is impaired, since the valuable gloss of the peeled surface is lost.

Another method, based on a thermal action on the tomatoes entails their processing with a hot mixture ($t$=300 to 400° C.) of air and smoke gases. The machines for carrying out this method of peeling tomatoes have among others the following disadvantages; a high percentage of deformed peeled tomatoes and a high energy consumption, as a result of thermal losses and a poor heat exchange. Because of their complex, heavy and expensive construction, which is not ideally suitable for peeling tomatoes and their uneconomical operation, these machines have not found a large application in production.

In another method, the processed products move by means of a conveyor through steel pipes, which are heated electrically up to about 800° C. Under the convective action of the hot air in the pipe and the radiant action of the pipe heated to a high temperature, the skin is cracked and separates. With this method of processing, a large quantity of electric energy is consumed and the eating properties of the processed products are poor.

Furthermore, this method creates bad working conditions, there being difficulties in ensuring the safety of labor.

Flow production lines are known where the peeling of the tomatoes previously whitened at 100° C. for several minutes, is carried out by pressing them mechanically through rubber conical hoses with a furrowed surface.

Flow production lines are also known, where the peeling is carried out mechanically by pressing the whitened tomatoes between plastic cams.

Both aforementioned production lines cannot peel round varieties of tomatoes which, thanks to their better properties, have established themselves on the world market. The losses are high, the percentage of usable tomatoes being below 60 percent. The machines for peeling are expensive, heavy and of complex construction, requiring a considerable erection area, as well as highly qualified and expensive maintenance.

It is therefore, a general object of the present invention to avoid the drawbacks of the aforementioned methods, by providing a method insuring a high percentage of peeled fruits and vegetables, tomatoes in particular, with which it is possible to peel different varieties of fruits and vegetables, regardless of their degree of ripeness, preserving the surface gloss and a high quality of the finished production. It is another object of this invention to provide the dissociation of the gases contained inside the tissues of the processed products, eliminating in this way the necessity of a subsequent treatment to exhaust gas from the processed products.

The method for peeling fruits and vegetables in accordance with the present invention consists in that the fruits and vegetables are heated superfically from 60 to 100° C., and are thereafter placed in a vacuum having a maximum absolute pressure of 460 mm. mercury column, where an explosive separation of the skin is caused as a result of the fast boiling of the liquid contained below the skin, and then the fruits and vegetables are taken out of the vacuum and are processed in known ways.

After the separation of the skin, the fruits and vegetables can be held in the vacuum longer than 40 seconds, and during this time the gases contained in their tissue separate.

The apparatus of the invention may include a continuous conveyor driven intermittently in a known way, to which cups are fastened at equal distances. Located immediately adjacent the conveyor are a portion feeder, a heater, a vacuum chamber and a stationary support.

For a better understanding of the invention, reference should be had to the accompanying drawings in which there is illustrated a preferred embodiment of the method and apparatus of the invention. In the drawings:

FIG. 2 is a schematic view of an apparatus for peeling fruits and vegetables in a vacuum, the apparatus having a conveyor of the linear type equipped with a vacuum chamber which is reciprocated toward and away from the conveyor;

Figure 1:
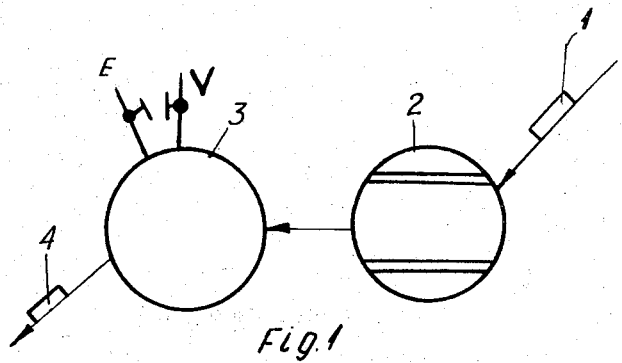
FIG. 1 is a diagrammatic illustration of the method for peeling fruits and vegetables in a vacuum.

In all drawings the pipelines for feeding water or fruit or vegetable juice are indicated by the reference character E, while the vacuum pipelines are indicated by the reference character V.

FIG. 1 illustrates diagrammatically the method of the present invention. By means of the feeder 1 the fruits or vegetables are fed continuously or intermittently in batches to the heater 2, where they are heated superficially up to 70–100° C. Thereafter the heated fruits or vegetables enter the vacuum chamber 3 in which the absolute pressure is 460 mm. mercury column or lower. The pressure in chamber 3 may be as low as an absolute pressure of 260 mm. or even 60 mm. mercury column. In chamber 3, under the action of the pressure of the fast forming water vapors which overcome the resistance of the skin, they are peeled in an explosive way. The peeled fruits and vegetables are delivered by means of the delivery device 4 to the station for final peeling inspection.

When the fruits and vegetables are held for a longer period of time in the vacuum chamber, a large quantity of the gases contained in their internal tissue separates. In this case, the disturbance of the vacuum after the peeling and deaeration processes is carried out by a liquid—water or juice from a pipeline E.

A first embodiment of apparatus for peeling fruits and vegetables in vacuum is shown in FIG. 2. Such apparatus for peeling fruits and vegetables is of the linear type. The element is a portion feeder feeding synchronously the periodically moving conveyor 5. This conveyor, equipped with equally spaced cups 6, passes through a heater 2, disposed immediately adjacent a vacuum chamber 3. Below chamber 3 there is a stationary support 10. The vacuum chamber, whose transverse cross-section corresponds to that of the cups 6, is equipped with a seal 12, a pipe V for creating the vacuum, and a pipe E for disturbing or breaking the vacuum. By means of a driving mechanism 11 pipe E is moved reciprocatingly with a certain detainment in the bottom end position, synchronously with the stoppage of the conveyor. Driving means 11 may include a pinion on an oscillatable shaft, such pinion meshing with a rack gear affixed longitudinally of a vertically reciprocable rod R to which vacuum chamber 3 is affixed.

At the end of the conveyor 5 there is disposed a delivery feeder 9 for the final peeling and inspection of the peeled products. The vacuum chamber is equipped with a sight glass 37. Beneath the entering end of the lower, return run of conveyor 5 there is a sprinkler system 8 for washing the cups 6.

The operation of the apparatus for peeling fruits and vegetables in vacuum of the linear type shown in FIG. 2 is as follows:

The feeder 1 feeds fixed portions of tomatoes 7 to the cups 6 of the conveyor 5. Passing through the heater 2, the fruits and vegetables are heated superficially to 70–100° C., and then the cups 6 are positioned singly and in succession over the support 10. At the same time, the vacuum chamber 3 moves downward, pressing the cup 6 and sealing it tight, while vacuum is created through the pipeline V. Upon breaking the vacuum by opening the pipeline E, the vacuum chamber is lifted upward, the now uncovered cup 6 is left free and it is moved away during the next motion of the conveyor. The peeled products are discharged from the cup onto the delivery feeder 9 for final peeling and inspection, while the cups are washed by the sprinkler system 8.

If required, the tomatoes can be held for a long period of time in the vacuum chamber in order also to cause a dissociation of the gases contained inside the vegetable or fruit tissue, eliminating thereby the necessity of a subsequent exhausting of the gases before sterilization of the peeled products. In this case the vacuum will be broken by feeding water or juice through the pipeline E.

The aforedescribed device can also be designated with a stationary vacuum chamber 3 and a moving support 10, synchronized with the motion of the conveyor.

Figure 3:
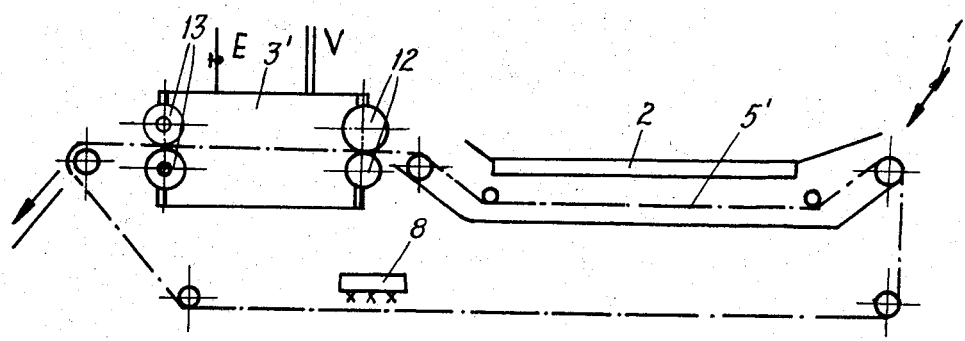
FIG. 3 is a schematic view of a second embodiment of the apparatus, such apparatus being equipped with a stationary vacuum chamber having sealing devices.

FIG. 3 illustrates a second embodiment of apparatus in accordance with this invention. In this case the conveyor 5' moves continuously, while the vacuum chamber 3' is stationary and is equipped with an inlet and an outlet sealing device 12 and 13, respectively.

Figure 4:
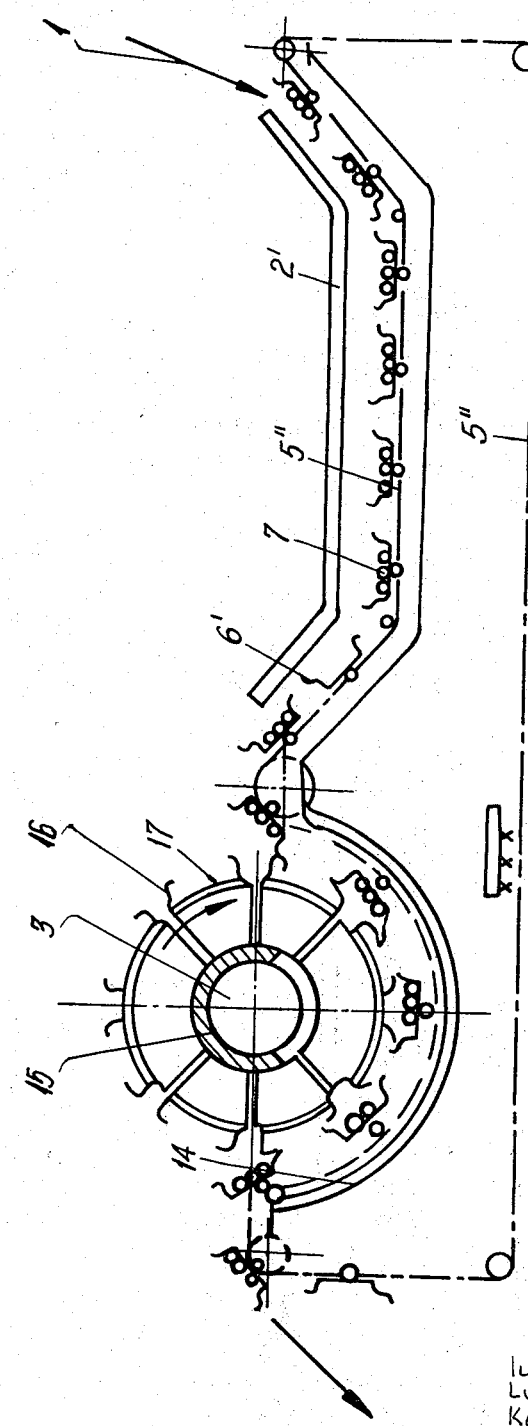
FIG. 4 is a schematic view of a third embodiment of the apparatus, such apparatus being equipped with a rotating vacuum chamber.

FIG. 4 illustrates a third embodiment of apparatus in accordance with this invention. The conveyor 5", after the heater 2', moves along a semicircle defined by a guide 14, such guide 14 serving at the same time as a support for the cups 6'. The vacuum chamber has a hollow axle 3', rotating around which is a rotor 17, on whose outer surface there are fastened lugs 16, the peripheral velocity of which is equal to the speed of motion of the conveyor 5'. When rotating, lugs 16 press the cups 6' and seal them. A distributor 15 is mounted on the vacuum chamber and provides a connection between the chamber and the lugs, when the latter are pressing the cups.

Figure 5:
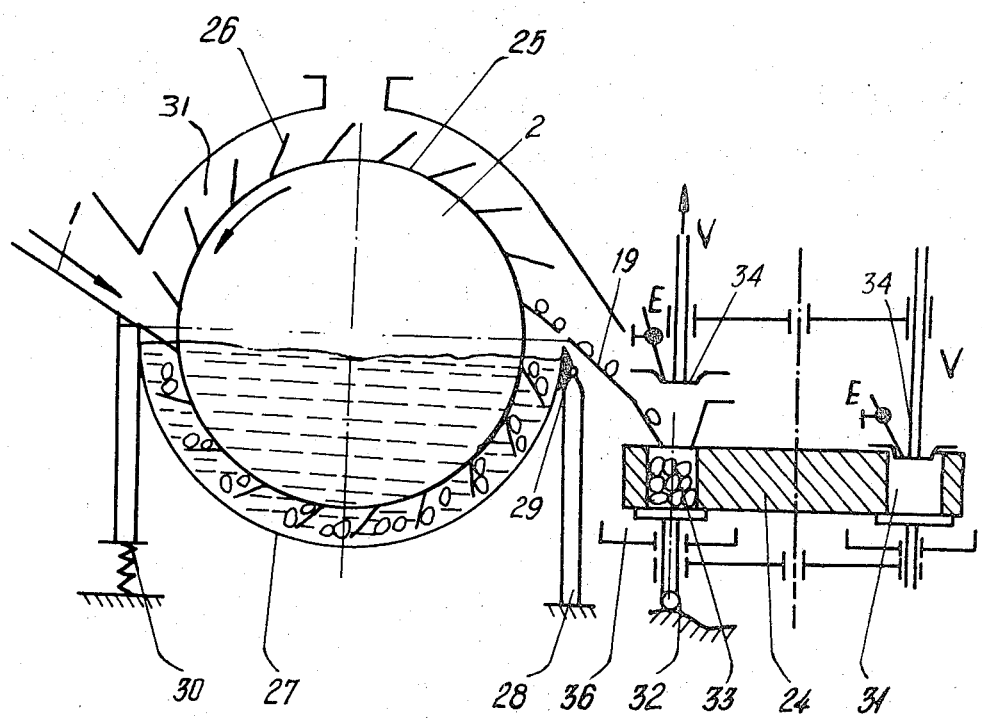
FIG. 5 is a schematic view of a device for peeling fruits and vegetables in a vacuum, such device being of the merry-go-round type.

FIG. 5 shows an apparatus for peeling fruits and vegetables of the merry-go-round type. It consists of a feeder 1, a drum heater 2" and the merry-go-round device 24. The heater is a perforated drum 25 with axial shaped blades 26, rotating inside the housing 27, which is equipped with a cover. The heater is attached to the frame 28 by means of a hinge 29. The frame is equipped with a regulating screw mechanism 30.

The merry-go-round device 24 includes a rotating disc equipped with working chambers 31, below which there are the lower covers or bottoms 32, which are coaxial with the chambers and, rotating simultaneously with the disc are guided by cam followers on the stationary cam track 33. Likewise coaxially with the working chambers, but disposed over them, upper covers 34 rotate about a vertical axis coaxial of the disc 24, covers 24 being reciprocated vertically by cam followers attached thereto and running along a fixed cam guide track, not shown. Covers 34 are equipped with a vacuum pipeline V and a pipeline E for disturbing the vacuum. The heater and the merry-go-round device are connected by means of the conduit 19.

The manner of operation of the apparatus of FIG. 9 is as follows: The fruits and vegetables having fallen between the drum 25 and the housing 27, are guided by the blades 26; they pass through the zone of heating and then through the conduit 19, while the upper cover 34 is lifted and the cam follower 32 is tightly pressed to the merry-go-round device 24, they pass into the working chambers 31 through their top orifice. While the merry-go-round device is rotating, the upper cover 34 descends and seals the working chamber, and immediately afterwards the vacuum pipeline V is operated. The vacuumization is carried out during the further rotation of the merry-go-round device, whereafter the valve (not shown) of the pipeline E for disturbing the vacuum is opened, the upper cover 34 guided by the corresponding cam is lifted, while the lower cam follower descends, being guided by the cam 32. The peeled fruits and vegetables then fall down and enter the hopper 36. Then follows the washing of the lower cover 33 and the working chamber, which then travels anew below the conduit 19 ready for a new working cycle. The screw mechanism 30 can rotate the whole heater around the hinge 29 in order to regulate the time of heating, regardless of the rate of production of the apparatus.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A method of peeling fruits and vegetables, comprising placing the fruits and vegetables with skins intact in a receptacle, passing the receptacle with its contents through a heating zone to heat said contents superficially to 60–100° C., sealing the receptacle, and subjecting the interior of the sealed receptacle to a vacuum to cause the explosive separation of the skins.

2. A method according to claim 1, comprising breaking the vacuum in the receptacle by introducing liquid thereinto.

3. A method according to claim G, wherein the vacuum applied in the receptacle has an indicated pressure lower than 300 mm. mercury column.

4. A method according to claim 1, wherein the fruit or vegetables are placed in a further receptacle after the heating procedure.

References Cited
UNITED STATES PATENTS

| | | | |
|---|---|---|---|
| 2,490,112 | 12/1949 | Winters | 146—48 |
| 2,831,516 | 4/1958 | Buck | 146—48 |
| 1,173,230 | 2/1916 | Vaudreuil | 146—48 |

WILLIE G. ABERCROMBIE, Primary Examiner

U.S. Cl. X.R.

99—472